(12) United States Patent
Lakic

(10) Patent No.: US 7,762,622 B2
(45) Date of Patent: Jul. 27, 2010

(54) STRUCTURAL MEMBER FOR A MOTOR VEHICLE

(75) Inventor: Alex John Lakic, Wellesbourne (GB)

(73) Assignee: Ford Global Technologies, LLC, Dearborn, MI (US)

( * ) Notice: Subject to any disclaimer, the term of this patent is extended or adjusted under 35 U.S.C. 154(b) by 85 days.

(21) Appl. No.: 11/935,713

(22) Filed: Nov. 6, 2007

(65) Prior Publication Data

US 2008/0106123 A1 May 8, 2008

(30) Foreign Application Priority Data

Nov. 6, 2006 (GB) .................................. 0622027.1

(51) Int. Cl.
B62D 25/04 (2006.01)
(52) U.S. Cl. ..................... 296/193.06; 296/30
(58) Field of Classification Search ............ 296/193.06, 296/30, 205, 203.03, 187.01; 52/735.1
See application file for complete search history.

(56) References Cited

U.S. PATENT DOCUMENTS

| | | | |
|---|---|---|---|
| 3,786,548 A | 1/1974 | Haskell | |
| 5,752,305 A | 5/1998 | Cotterill et al. | |
| 5,941,597 A * | 8/1999 | Horiuchi et al. | 296/203.01 |
| 6,099,071 A | 8/2000 | Kasuga et al. | |
| 2004/0113461 A1* | 6/2004 | Shimizu et al. | 296/193.06 |

FOREIGN PATENT DOCUMENTS

| | | |
|---|---|---|
| BE | 511181 | 5/1952 |
| EP | 0127343 | 7/1990 |
| JP | 57-1516 | 6/1982 |
| JP | 4-147845 | 5/1992 |

* cited by examiner

*Primary Examiner*—Joseph D Pape
(74) *Attorney, Agent, or Firm*—Tung & Associates; Raymond L. Coppiellie

(57) ABSTRACT

A structural member of a motor vehicle, e.g., a "B" pillar, comprises a reinforcing member having an elongate core of ultra high strength steel and a casing of aluminum alloy, the casing having a constant section profile with a closed section cavity. The core is encased within the casing and the core and the casing bonded together by co-drawing the core and the casing through a die. The casing has a pair of spaced flanges which connect the reinforcing member to aluminum alloy pressings to form the structural member. The reinforcing member has considerable yield strength from the use of the ultra high strength steel in the core while the flanges, being of aluminum alloy, are readily joined by self-piercing rivets.

10 Claims, 9 Drawing Sheets

STRUCTURAL MEMBER FOR A MOTOR VEHICLE

FIELD OF THE INVENTION

This invention relates to motor vehicles and in particular to the production of a motor vehicle having low weight and a high resistance to deformation in the event of a collision.

BACKGROUND OF THE INVENTION

It is well known that in order to improve fuel efficiency and emissions it is desirable to produce a lightweight motor vehicle. In order to achieve this goal, several vehicle manufacturers have proposed vehicles in which a substantial proportion of the body structure or bodyshell is constructed from a lightweight material such as an aluminum alloy. An example of such a vehicle construction is shown in U.S. Pat. No. 6,099,071.

Some sections of such a bodyshell act as beams for which a substantial yield strength is a principal requirement. For a bodyshell assembled from aluminum pressings and extrusions, the yield strength of the aluminum dictates the thickness of material required in these places. This can result in the design being bulky, heavy and expensive compared to a design using high strength steel, thereby eliminating much of the anticipated weight saving from the use of aluminum.

One way of optimizing the use of aluminum is to integrate a steel reinforcement into the structure. However, many existing methods of joining steel and aluminum such as brazing, adhesive bonding, bolting, or riveting have disadvantages in motor vehicle production, particularly for mass-produced passenger cars. In particular, brazing provides inadequate joint strength. Adhesive bonding requires supplementary mechanical fixings such as riveting or bolting to avoid peel failure and to fix the geometry of an assembly prior to curing. Bolting is time consuming and difficult to accommodate where space on a component is limited, e.g., in the posts, or pillars of the upper structure of a bodyshell. Blind riveting is more space efficient than bolting but can be even more time consuming.

One quick, space efficient and repeatable method for fastening together bodyshell components in a mass production environment is the use of a self-piercing riveting process such as described in U.S. Pat. No. 5,752,305, hereby incorporated by reference.

Hence it is desirable to be able to join a high yield strength steel reinforcement to an aluminum structure using self-piercing rivets since this can be done in a cost effective manner and produces a joint with the required strength. For steels having a low to moderate yield strength (e.g. up to 440 MPa) such joining is possible by directly fastening the steel to aluminum using self pierce riveting. However, such steels do not have a sufficiently high yield strength to produce the required combination of low weight and resistance to bending. When steel having a sufficiently high yield strength (e.g. 950 MPa) is used, then self-piercing rivets cannot be used because the steel is too hard to yield during the riveting process.

The reinforcement of aluminum profiles with steel is known, e.g., from BE511181 where an aluminum glazing profile is shown and from JP57-001516A where a trolley wire is described as being made by extruding an aluminum coat over a steel core. However, in neither case is the profile suitable for a structural member of a motor vehicle where high strength has to be combined with the ability to readily join the structural member to other components of the bodyshell. While in U.S. Pat. No. 5,941,597, a steel reinforcement of an aluminum extrusion has been proposed for such a structural member, this is simply fitted inside the extruded section to increase stiffness.

It is thus an object of this invention to provide a structural member for a motor vehicle bodyshell which includes a reinforcing member of low weight and a high resistance to bending and can be easily joined to other components of the bodyshell.

SUMMARY OF THE INVENTION

According to a first aspect of the invention there is provided a structural member for a motor vehicle, the structural member comprising at least one panel member and a reinforcing member, the reinforcing member comprising an elongate core of a relatively high yield strength metal and a casing of a relatively low yield strength metal having a constant section profile with an internal wall defining a closed section cavity, the core being encased within the casing and the core and the casing being bound together by co-drawing the core and the casing through a die, the casing having a pair of spaced flanges connecting the reinforcing member to at least one panel member.

At least one of the casing and the internal wall of the core may be coated with an adhesive before co-drawing to increase bonding between the core and the casing.

The core may be made from ultra high strength steel, preferably with yield strength of at least 500 MPa. More advantageously, the yield strength is at least 900 MPa The casing may be made from lightweight non-ferrous material, preferably an aluminum alloy.

The core may be a profiled flat strip, non-planar in cross-section and having two longitudinally extending edges, in which case the material forming the longitudinal edges may be bent back on itself to form double-thickness end sections to reduce the stress concentration effect of the core on the casing. Alternatively, the core may be tubular.

Preferably, the casing is joined to at least one panel member by self-piercing rivets.

In a second aspect of the invention, there is provided a method of manufacturing a body structure for a motor vehicle including the steps of producing a number of reinforcing members by providing an elongate core of a relatively high yield strength metal, a casing of a relatively low yield strength metal and having a constant section profile with a pair of spaced flanges and an internal wall defining a closed section cavity, placing the core within the cavity and co-drawing the core and the casing through a die to bind the casing to the core, producing a number of panel members each having a pair of spaced flanges corresponding to the spaced flanges on the reinforcing member, connecting the reinforcing members and the panel members at the spaced flanges to form structural members, providing a number of body panels and attaching the structural members and the body panels together in a predetermined arrangement to produce the body structure.

BRIEF DESCRIPTION OF THE DRAWINGS

The invention will now be described by way of example with reference to the accompanying drawings, of which.

DETAILED DESCRIPTION OF THE PREFERRED EMBODIMENTS

Figure 1:
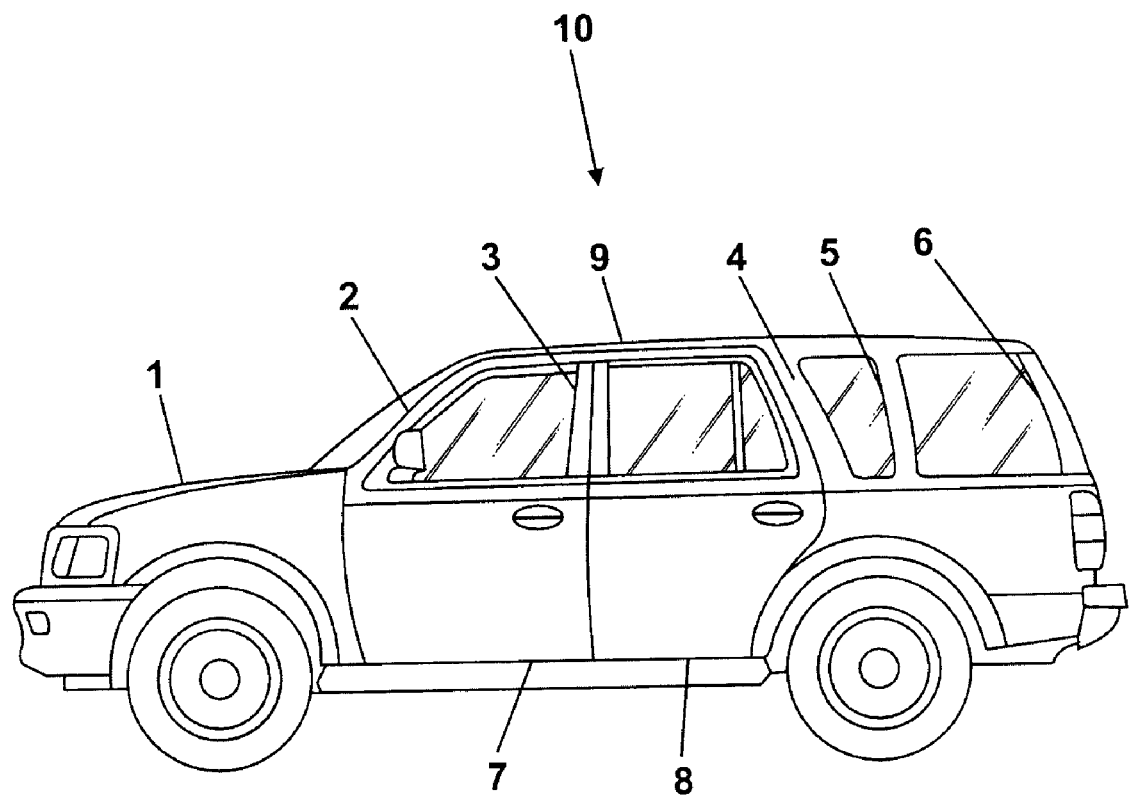
FIG. 1 is a left hand side view of a motor vehicle having a structural member according to the invention.

With reference to FIG. 1 there is shown a motor vehicle 10 having a body structure 1 comprised of a number of aluminum panels fastened to a number of underlying aluminum structural members (not visible on FIG. 1) and aluminum side structural members including an "A" post 2, a "B" post 3, a "C" post 4, a "D" post 5 and a "E" post 6, the side structural members being used to connect a roof 9 to a lower body structure. The vehicle 10 also includes a number of doors including a front door 7 and a rear door 8.

Figure 2:
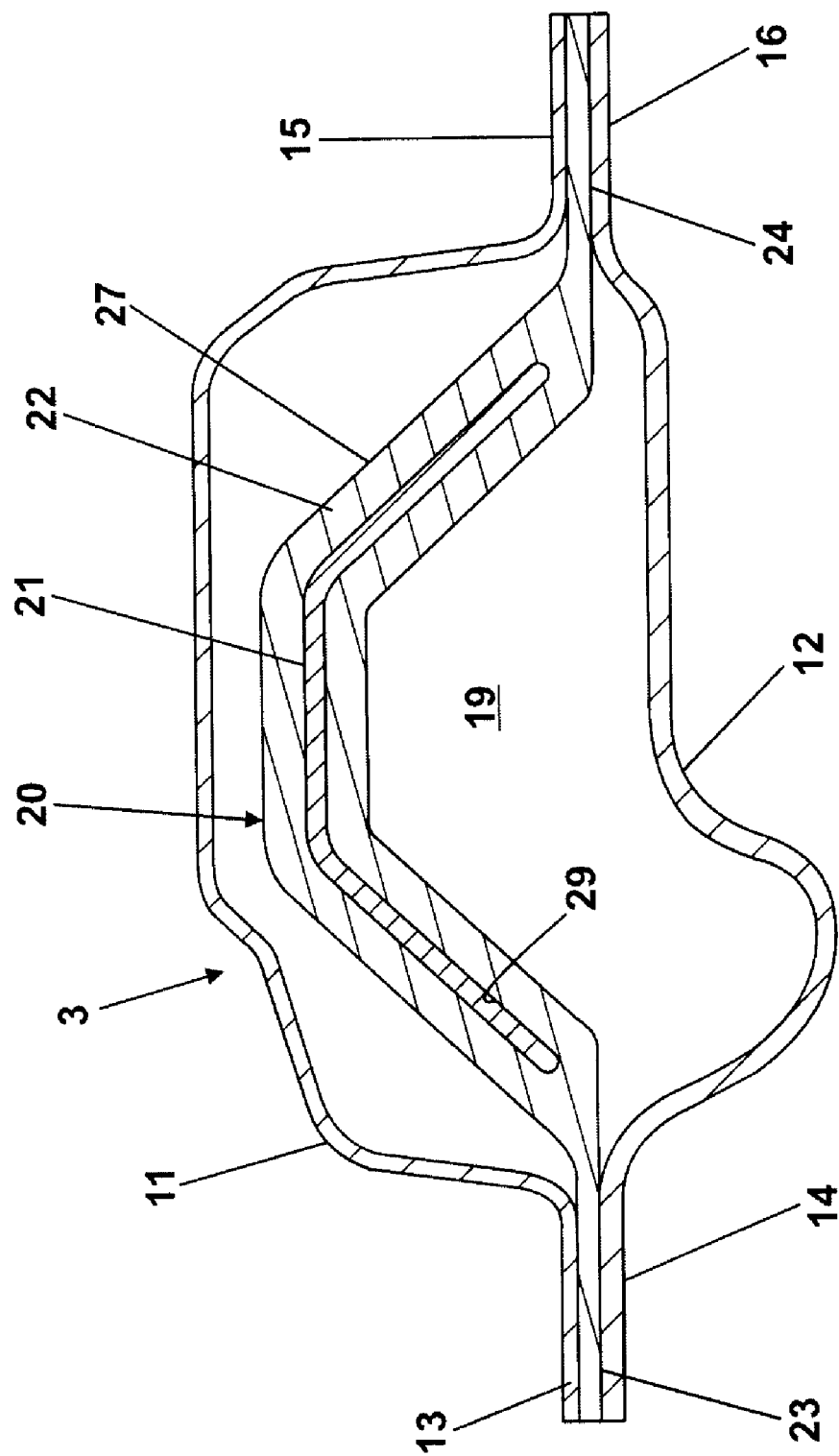
FIG. 2 is a cross-section through a "B" post, or "B" pillar, forming part of the body structure of the vehicle shown in FIG. 1 and incorporating one example of a reinforcing member.

Referring further to FIG. 2, the "B" post 3 is formed from a first elongate panel member in the form of an aluminum pressing or stamping 11 and a second elongate panel member in the form of another aluminum pressing or stamping 12. The first pressing 11 has a first flange 13 extending along one edge and a second flange 15 extending along an opposite edge. Similarly the second pressing 12 has a first flange 14 extending along one edge and a second flange 16 extending along an opposite edge. The first and second pressings 11 and 12 when assembled together form an internal volume 19 in which is fastened a reinforcing member 20.

The reinforcing member 20 comprises a steel core 21 encased in an aluminum casing 22. The core 21 is formed of a profiled flat strip, being non-planar in its transverse cross-section so as to improve its resistance to bending. The casing 22 has a body portion 27 in which the core 21 is located and two longitudinally extending flanges 23, 24 of uniform width which extend along the length of the body portion 27.

The reinforcing member 20 can be manufactured in the following manner. The steel core 21 is formed into a constant section profile having the desired shape, e.g. by rolling from flat strip. The aluminum casing 22 is then extruded to form a constant section profile with an internal wall defining a closed section cavity 29. The shape of the cavity 29 within the casing 22 is designed to match the geometry of the steel core 21 and is sized so that the steel core 21 can be loosely fitted into the cavity 29. The casing 22 is then co-drawn with the steel core 21 through a die to bind the casing 22 to the core 21 in a manner substantially as described in JP57-001516A, hereby incorporated by reference. The residual pressure of the casing 22 on the core 21 may well be sufficient to bind the casing 22 to the core 21 but for additional bonding an adhesive may be introduced between the core 21 and the casing 22. If adhesive is applied, it can be applied either to only the core 21, to only the internal wall defining the cavity 29 in the casing 22, or to both surfaces. If adhesive is used, then this can be cured and the casing 22 can be heat treated at the same time. After drawing, an elongate member or beam is produced which can be left straight and cut to length to form the reinforcing member 20. Alternatively, the elongate member or beam can be cut to length and then be bent prior to heat treatment to form an appropriately shaped reinforcing member 20.

The reinforcing member 20 is fastened to the two pressings 11, 12 by placing the reinforcing member 20 onto the first pressing 11 with its flanges 23, 24 resting on and aligned with the first and second flanges 13, 15 of the first pressing 11. The first and second flanges 13, 15 of the first pressings 11 and the flanges 23, 24 of the reinforcing member 20 are then tacked together (i.e. joined at well-spaced locations) using self-piercing rivets, e.g. as described in U.S. Pat. No. 5,752,305. The rivets only have to pass through aluminum and so relatively low forces are required for this process. The second pressing 12 is then placed on top of the reinforcing member 20 so that its first and second flanges 14, 16 lie on top of and are aligned with the flanges 23, 24 of the reinforcing member 20. The first and second flanges 13, 15 and 14, 16, of the two pressings 11, 12 and the flanges 23, 24 of the reinforcing member 20, are then secured together using self-piercing rivets as referred to above but at closer locations.

Alternatively, the reinforcing member 20 is fastened to the two pressings 11, 12 by placing the reinforcing member 20 onto one of the first and second pressings 11 or 12 with its flanges 23, 24 resting on and aligned with the first and second flanges 13, 15 or 14, 16 of the first or second pressing. The other pressing 12 or 11 is then placed on top of the reinforcing member 20 so that its first and second flanges 14, 16 or 13, 15 lie on top of and are aligned with the flanges 23, 24 of the reinforcing member 20. The first and second flanges 13, 15 and 14, 16 of the two pressings 11, 12 and the flanges 23, 24 of the reinforcing member 20, are then secured together using self-piercing rivets as described above.

The completed structural member 3 can then be assembled into the body structure 1. Any panels or other members forming the body structure 1 that mate with the structural member 3 are designed to match it so that flanges or designated matching joining areas can be brought into contact with the flanges of the structural member 3 and be secured to it, preferably by self-piercing rivets. However, it will be appreciated that because no steel is present in the flanges of the structural member 3, the structural member 3 could be welded or bonded in position, e.g., as described in EP0127343.

Alternatively, the reinforcing member 20 may be fastened to existing panels of the body structure 1, the body panels that mate with the reinforcing member 20 having flanges that correspond to the flanges 23, 24 of the reinforcing member 20 to form a structural member which is integral with the body structure 1.

Figure 3:
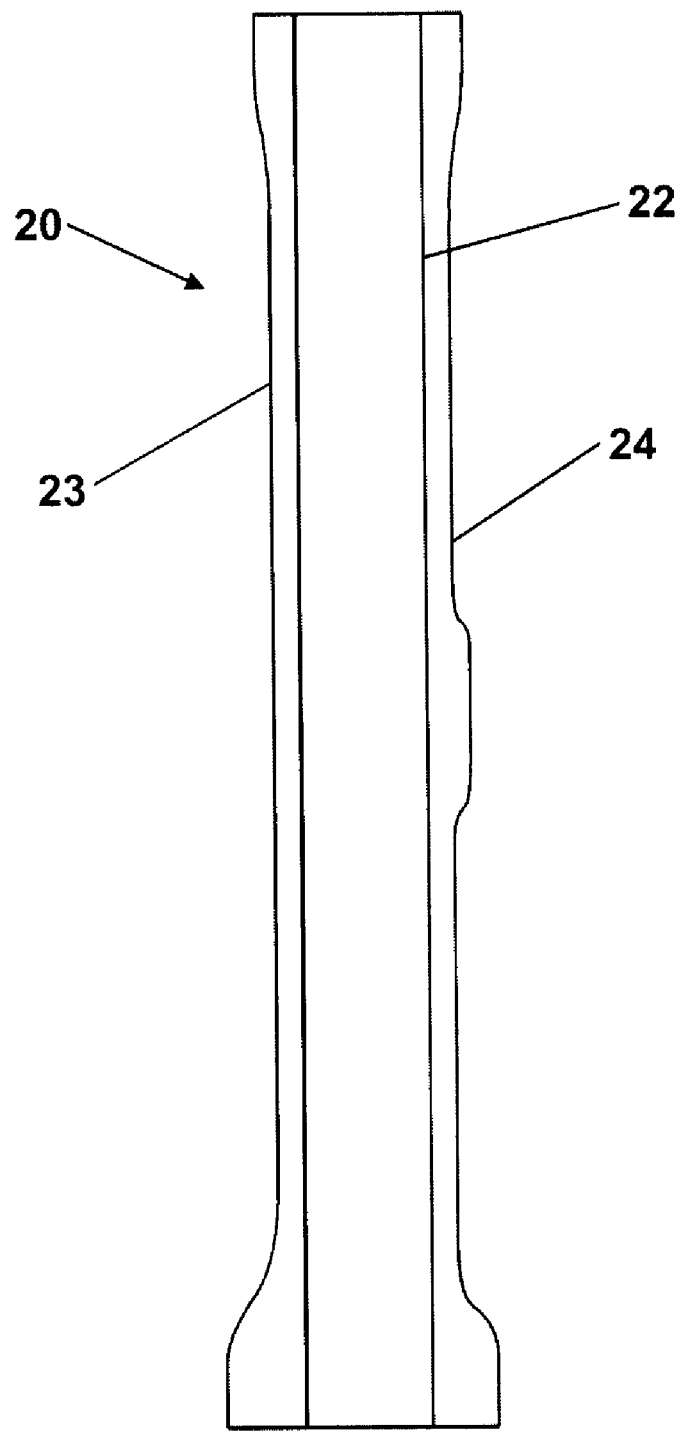
FIG. 3 is a side view illustrating how a reinforcing member shown in FIG. 2 is adapted for use in the "B" post shown in FIG. 1.

After co-drawing, the width of the flanges 23, 24 are of the maximum width required to produce the desired flange shape. Prior to assembly of the reinforcing member 20 into the two pressings 11, 12, the flanges 23, 24 can be trimmed so that their width is varied along their respective lengths so that the reinforcing member 20 conforms to the shape required of the structural member 3. This is described in FIG. 3. The flanges 23, 24 may be machined to produce the required shape or may be sheared or cut by laser. Alternatively, if required, the flanges 13, 15 and 14, 16 of the pressings 11, 12 may also have the same maximum width when the pressings 11, 12 are assembled and riveted to the reinforcing member 20 so that all the flanges 13, 14, 15, 16 & 23, 24 are trimmed to the required shape in the same operation. After the trimming operation the reinforcing member 20 may be bent to fit the other components as required. In a further variation, the reinforcing member 20 may be bent first and the trimming operation performed subsequently.

Figure 4:
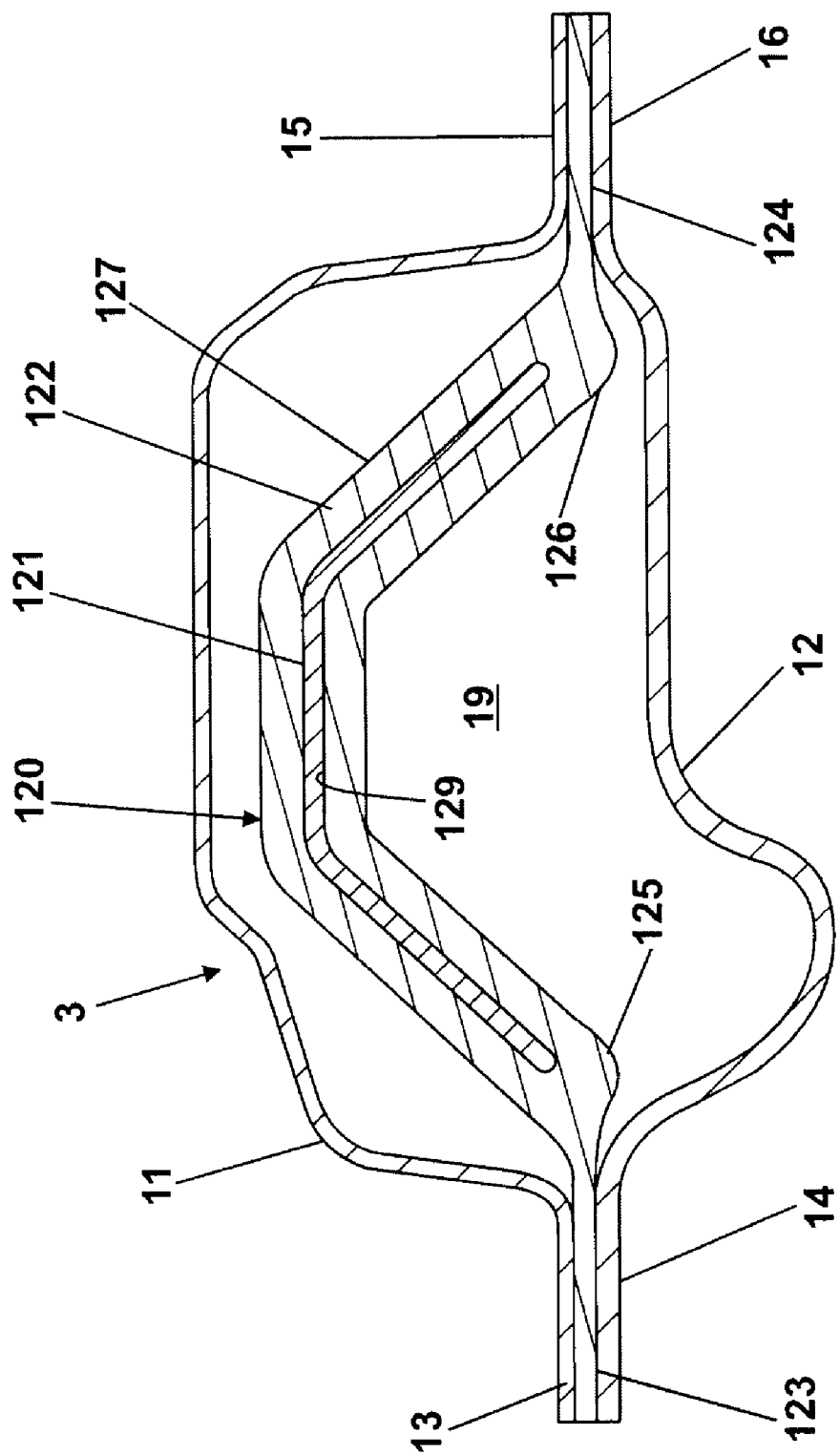
FIG. 4 is a cross-section similar to FIG. 2 showing a first modification to the reinforcing member shown in FIG. 2.

In a first alternative embodiment shown in FIG. 4, parts which are the same as those shown in FIG. 2 carry the same reference while those which are similar carry the same reference with the addition of 100. The reinforcing member 120 differs from that described with reference to FIG. 2 in that the casing 122 is formed with transition portions 125, 126 that change the stress gradient between the flanges 123, 124 and the body portion 127 when a transverse bending load is applied to the structural member 3. The reinforcing member 120 is manufactured exactly as before and so will not be described again in detail.

Figure 5:
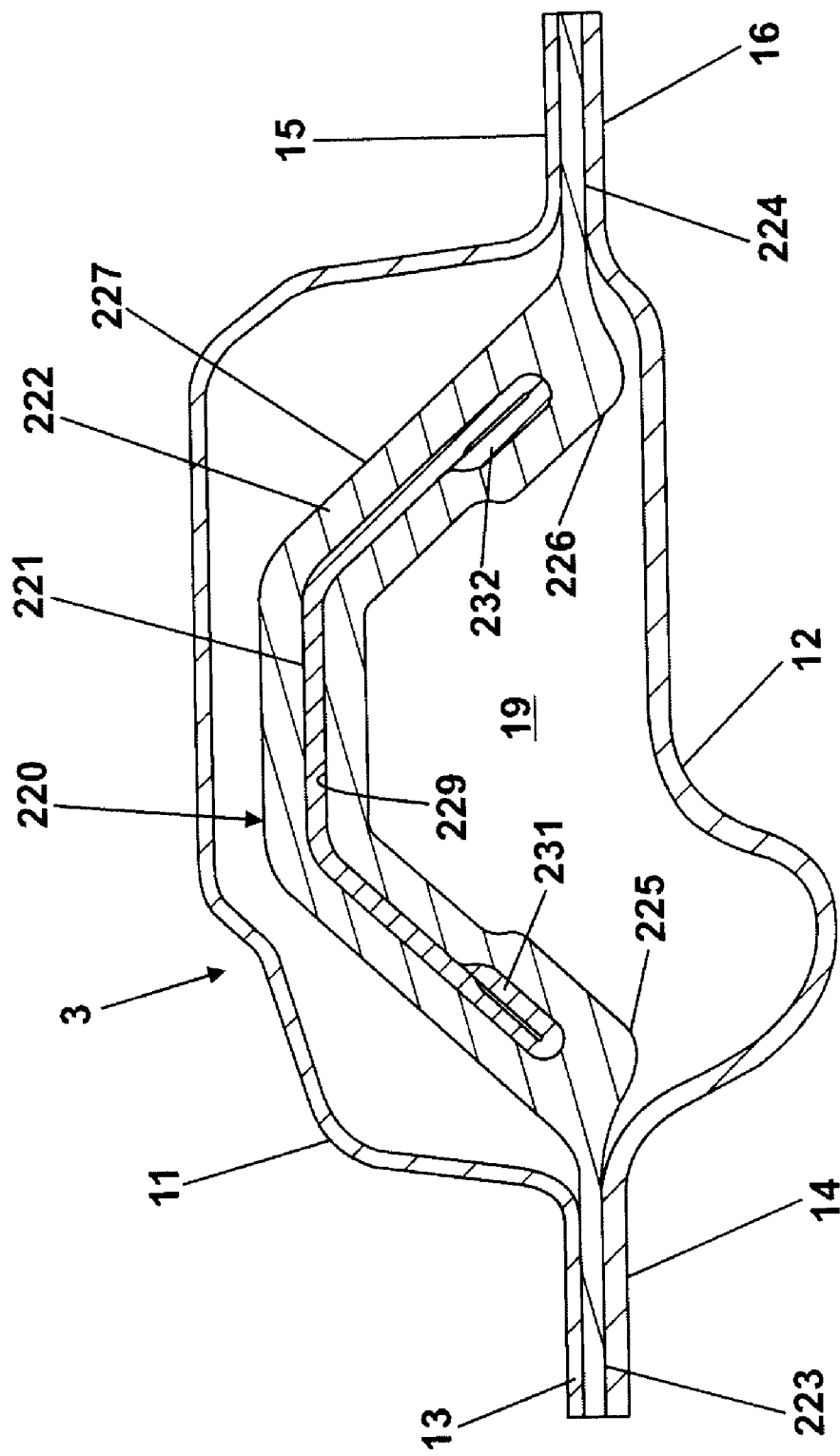
FIG. 5 is a cross-section similar to FIG. 2 showing a second modification to the reinforcing member shown in FIG. 2.

In a second alternative embodiment shown in FIG. 5, parts which are the same as those shown in FIG. 2 carry the same reference while those which are similar carry the same reference with the addition of 200. The reinforcing member 220 differs from that described with reference to FIG. 2 in that the casing 222 is formed with transition portions 225, 226 similar to the transition portions 125, 126 in FIG. 4 to change the stress gradient between the flanges 223, 224 and the body portion 227 when a transverse bending load is applied. Additionally, in order to minimize the stress raising effect of the steel core 221 on the casing 222 when subject to a bending load, the steel core 221 has end sections 231, 232 which are bent back upon themselves to form a double-thickness. This bending back increases the effective radius at the end of the steel core 221 thereby reducing its stress raising effect on the casing 222. The reinforcing member 220 is manufactured exactly as before and so will not be described again in detail.

Figure 6:
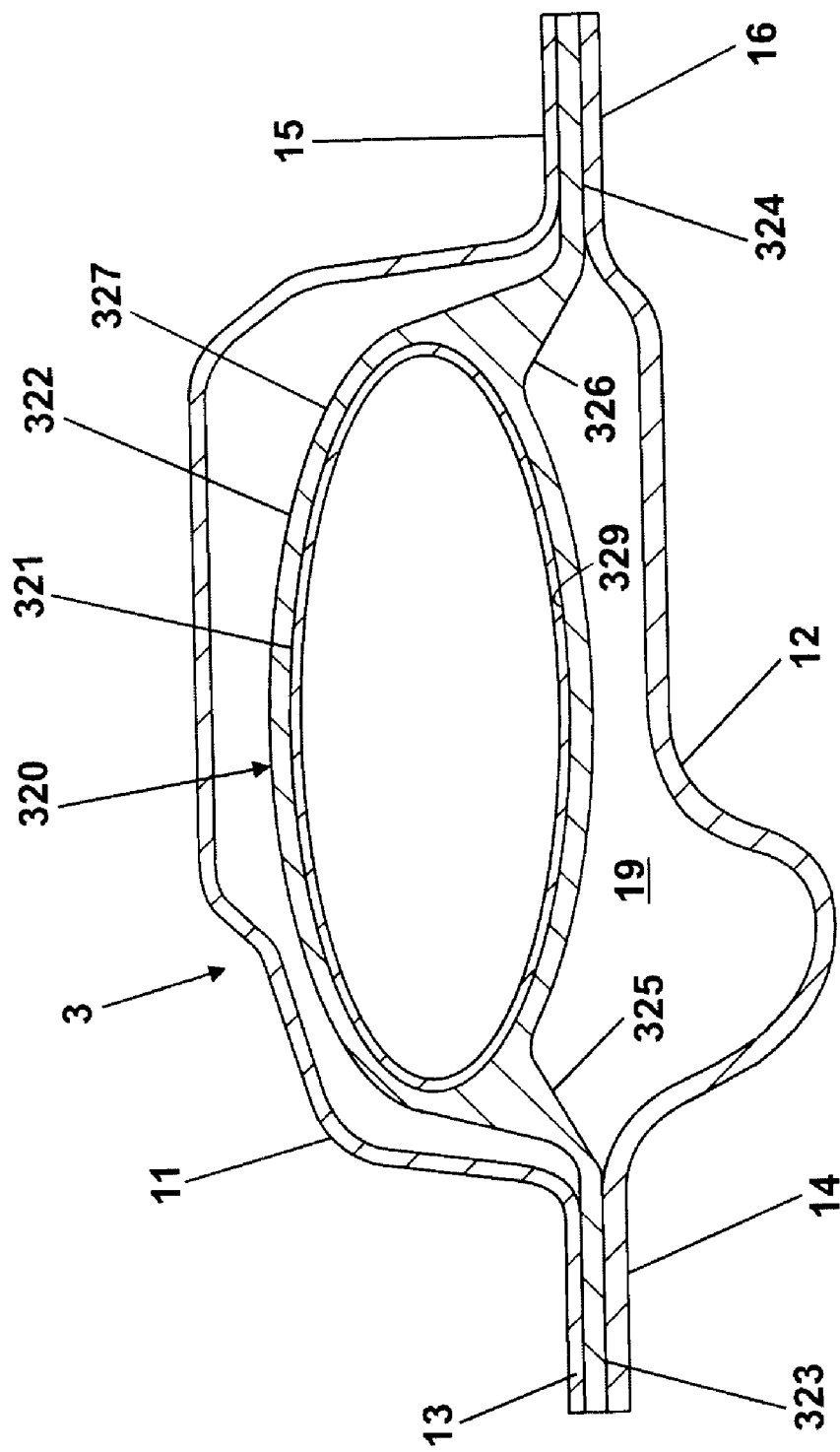
FIG. 6 is a cross-section through the "B" post forming part of the body structure of the motor vehicle shown in FIG. 1 showing a second example of a reinforcing member.

FIG. 6 shows another embodiment of a reinforcing member 320 which is intended to be a direct replacement for the reinforcing members 20, 120, 220 described with reference to FIGS. 2 to 5. Nevertheless, there are many parts of the structural member 3 which remain substantially the same as described in relation to FIGS. 2 to 5 so carry the same reference while those which are similar carry the same reference as in FIG. 2 with the addition of 300.

In this embodiment, the reinforcing member 320 comprises a steel core 321 of a tubular construction which is oval in transverse cross-section so as to improve its resistance to bending, the oval being elliptical. Transition portions 325, 326 change the stress gradient between the flanges 323, 324 and the body portion 327 when a transverse bending load is applied to the structural member 3. The thickness of the body portion 327 of the casing 322 surrounding the core 321 is greater than the thickness of the core 321 to avoid rupture of the casing 322 when the core 321 is deformed.

The reinforcing member 320 is manufactured as before and so will not be described again in detail. It is sufficient to say that the tubular core 321 is manufactured by extrusion or by any other convenient method such as rolling and seam welding, the core 321 is then inserted in the cavity 329 in the body portion 327 and the co-assembled parts are drawn together through a die and cut to length and bent if required to produce the reinforcing member 320. As before, adhesive can be used, if required, between the core 321 and the wall of the cavity 329 in the body portion 327.

Figure 7:
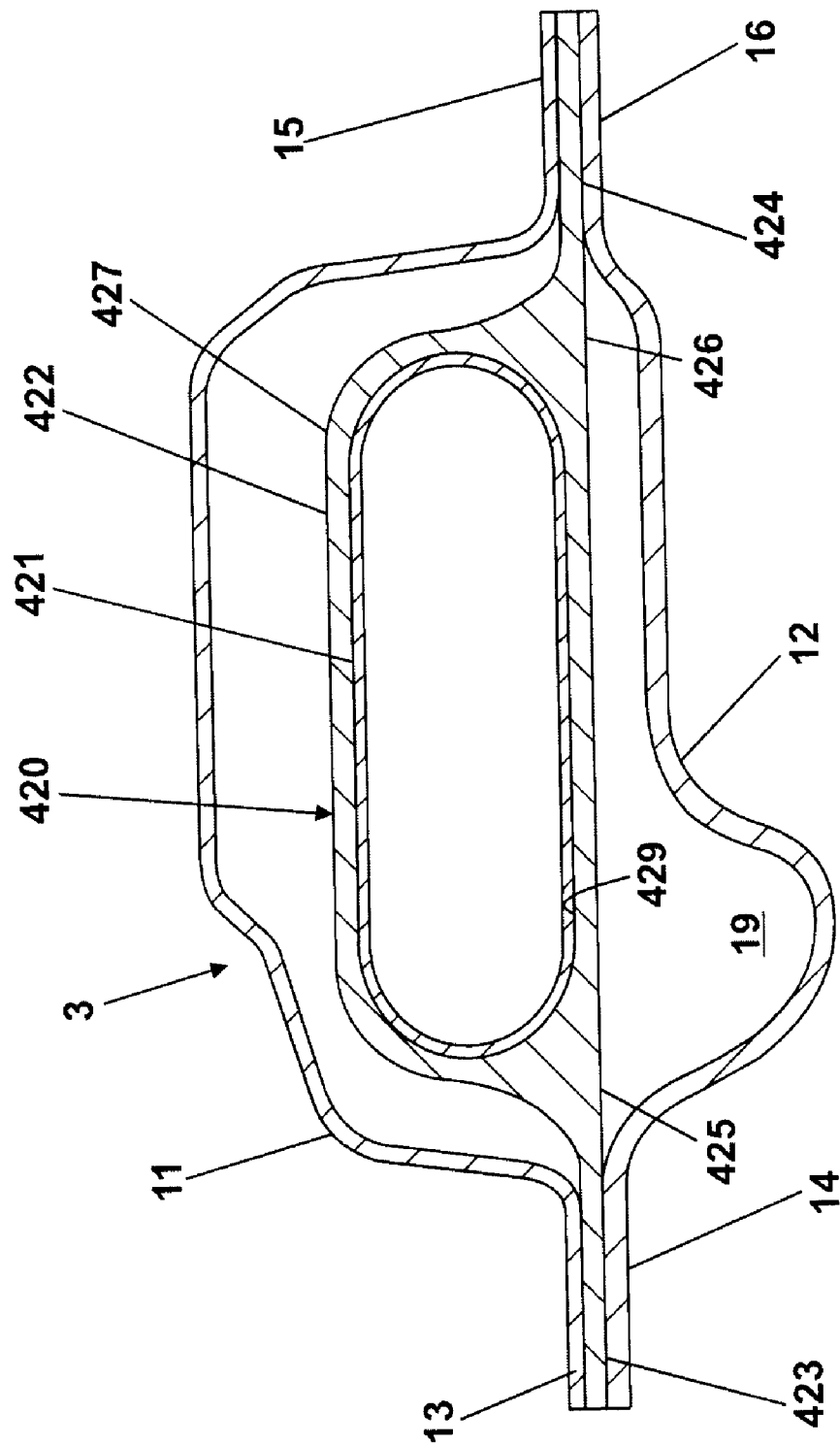
FIG. 7 is a cross-section similar to FIG. 6 showing a first modification to the reinforcing member shown in FIG. 6.

In a further embodiment shown in FIG. 7, parts which are the same as those shown in FIG. 6 carry the same reference while those which are similar carry the same reference with the further addition of 100. The reinforcing member 420 differs from that described with reference to FIG. 6 in that while the core 421 is of a tubular construction that is oval in transverse cross-section, in this case the oval has parallel sides which are also parallel to the flanges 423, 424 and semi-circular end sections connected to the flanges 423, 424 through the transition portions 425, 426.

Figure 8:
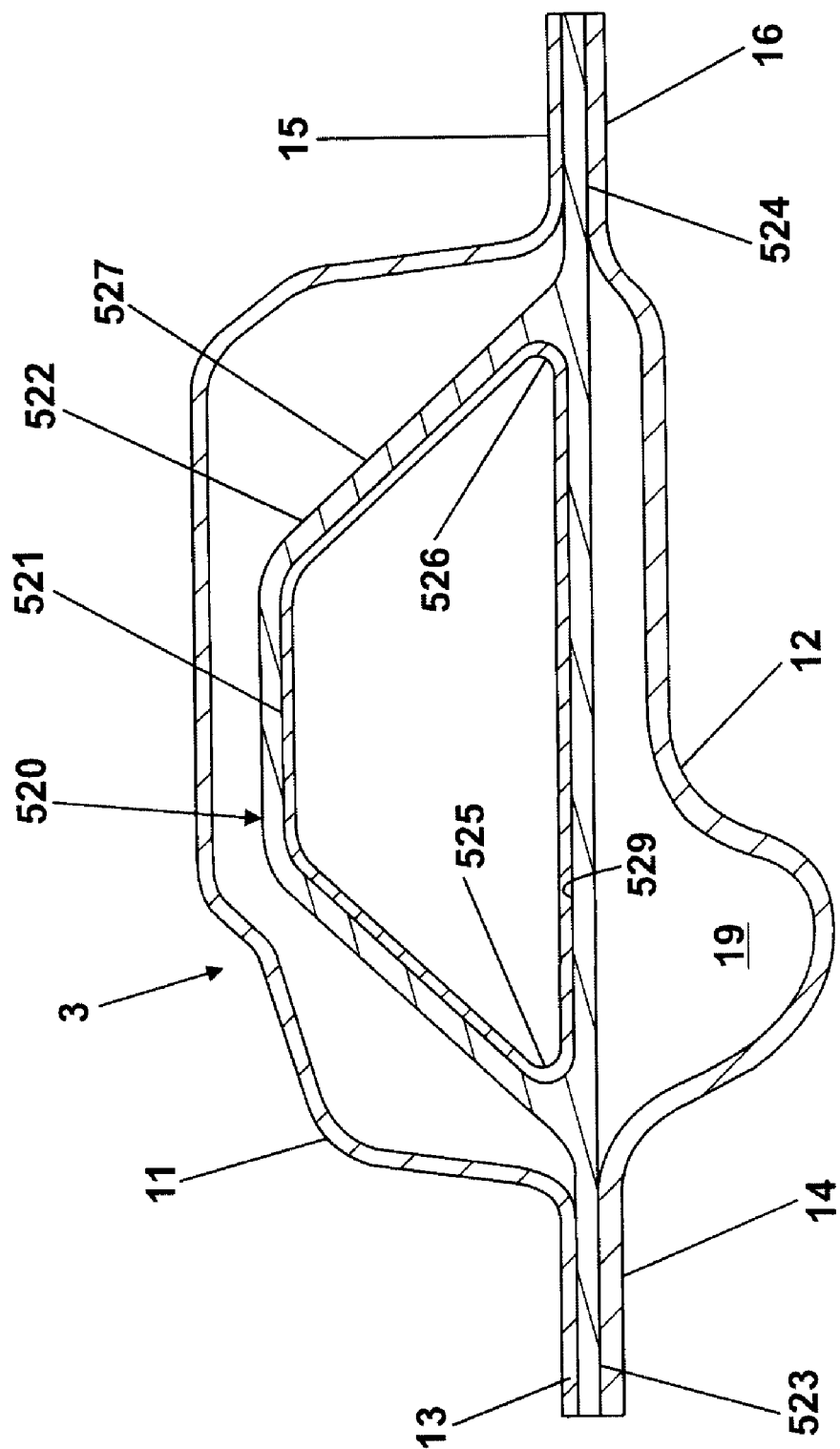
FIG. 8 is a cross-section similar to FIG. 6 showing a second modification to the reinforcing member shown in FIG. 6.

In another embodiment shown in FIG. 8, parts which are the same as those shown in FIG. 6 carry the same reference while those which are similar carry the same reference with the further addition of 200. The reinforcing member 520 differs from that described with reference to FIG. 6 in that the core 521, while also being of a tubular construction, is trapezoidal in transverse cross-section, again to improve its resistance to bending. This trapezoidal section is useful where the section of the structural member 3 would not allow a symmetrical section of reinforcing member 520 such as the reinforcing members 320, 420 shown in FIGS. 6 & 7.

Figure 9:
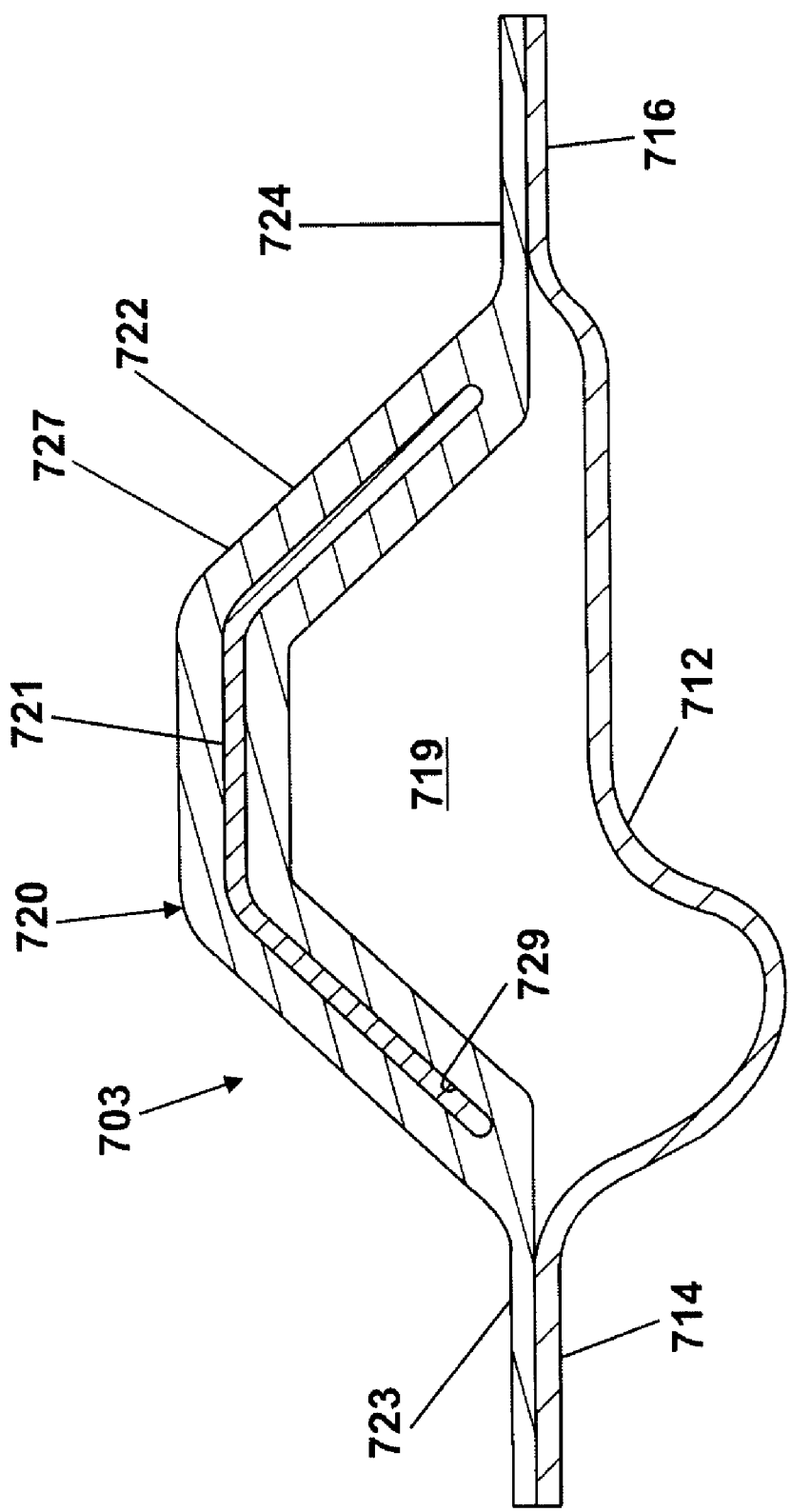
FIG. 9 is a cross-section through an alternative form of "B" post for use in the body structure of the motor vehicle shown in FIG. 1.

The alternative form of "B" post 703 shown in FIG. 9 has a number of similarities with the one shown in FIG. 2 so where appropriate the same references are used but with the addition of 700. The "B" post 703 differs from those previously described in that it uses only one pressing 712 in combination with a reinforcing member 720. The reinforcing member 720 comprises a steel core 721 encased in an aluminum casing 722, the core 721 being non-planar in transverse cross-section to improve its resistance to bending. The casing 722 has a body portion 727 in which is located the core 721 and two longitudinally extending flanges 723, 724 which are of uniform width and extend along the length of the body portion 727. The reinforcing member 720 is manufactured exactly as before and so will not be described again in detail.

The reinforcing member 720 is fastened to the pressing 712 by placing the reinforcing member 720 onto the pressing 712 such that its flanges 723, 724 rest upon and are aligned with the flanges 714, 716 of the pressing 712. The flanges 714, 716 of the pressing 712 and the flanges 723, 724 of the reinforcing member 720 are then secured together using self-piercing rivets to form the structural member 703. This arrangement has the advantage of the use of less components and potentially lower weight but can only be used when the reinforcing member 720 can be produced in a shape required to form part of the outer surface of the structural member 703. This might be where the exposed surface of the reinforcing member 720 is hidden by internal trim components of the vehicle 10.

It will be appreciated that the invention is generally beneficial when the core is of a material that has a yield strength sufficiently high to prevent it being secured using self-piercing rivets but that a core of ultra high yield strength steel will provide the greatest strength. In one proposed use of the invention it was calculated that an aluminum casting or extrusion of approximately 10 to 12 mm wall thickness with thin rivetable joining flanges could be replaced by a structural member according to the invention having a steel core 1.5 mm thick. It was estimated that a 950 MPa yield heat-treated boron steel for the core would provide four times the yield strength of the known aluminum solution and provide a component approximately 80% of the weight of the solely aluminum design and 50% of an all steel design. One example of an ultra high strength steel suitable for use for the core has a composition by mass of Carbon (C) 0.20%-0.25%, Silicon (Si) 0.15%-0.50%, Manganese (Mn) 1.00%-1.40%, Phosphorus (P)<0.030%, Sulfur (S)<0.025%, Chromium (Cr) 0.10%-0.35%, Molybdenum (Mo)<0.35%, Boron (B) 0.0015%-0.0050%. Additionally minute amounts of Aluminum (Al) and Titanium (Ti) may have been added for manufacturing purposes.

Although the invention has been described above as including a reinforcing member having a steel core and an aluminum casing it will be appreciated that other combinations could be produced with advantageous effect. For example, a high yield strength steel core could be used to reinforce a casing made from another non-ferrous lightweight material such as a magnesium alloy or a casing made from a low yield strength steel capable of being secured using self-piercing rivets. Similarly, although the invention has been described with reference to a "B" post, it will be appreciated that it could be used for other structural members on a motor vehicle including movable components such as a suspension arm. Also, although the reinforcing member has been described as joined to pressings to form the structural member, it may be joined to panel members made by other means such as extrusion or casting.

The invention claimed is:

1. A structural member for a motor vehicle, the structural member having at least one panel member and a reinforcing member, the reinforcing member comprising:
   an elongate core of a relatively high yield strength metal; and
   a casing of a relatively low yield strength metal having a constant section profile with an internal wall defining a closed section cavity, the casing having a pair of spaced flanges connecting the reinforcing member to said at least one panel member
   wherein the core is encased within the cavity and the core and the casing are bound together by co-drawing the core and the casing through a die.

2. The structural member claimed in claim 1 wherein at least one of the core, or the internal wall of the casing, is coated with an adhesive before co-drawing.

3. The structural member claimed in claim 1 wherein the core is made from an ultra high strength steel.

4. The structural member claimed in claim 3 wherein the ultra high strength steel has a yield strength of at least 500 MPa.

5. The structural member as claimed in claim 1 wherein the casing is made from lightweight non-ferrous material.

6. The structural member claimed in claim 5 wherein the lightweight non-ferrous material is an aluminum alloy.

7. The structural member claimed in claim 1 wherein the core is profiled flat strip, non-planar in cross-section and having two longitudinally extending edges.

8. The structural member claimed in claim 7 wherein the material forming the longitudinal edges is bent back on itself to form double-thickness end sections.

9. The structural member claimed in claim 1 wherein the core is tubular.

10. The structural member claimed in claim 1 wherein the casing is joined to said at least one panel member by self-piercing rivets.

* * * * *